(No Model.)

S. REMBERT.
EXHAUST FAN.

No. 579,081. Patented Mar. 16, 1897.

WITNESSES:
Fred L. Dieterich
P. B. Turpin.

INVENTOR,
Samuel Rembert.
BY Munn & Co.
ATTORNEYS.

UNITED STATES PATENT OFFICE.

SAMUEL REMBERT, OF MEMPHIS, TENNESSEE.

EXHAUST-FAN.

SPECIFICATION forming part of Letters Patent No. 579,081, dated March 16, 1897.

Application filed November 30, 1894. Serial No. 530,386. (No model.)

*To all whom it may concern:*

Be it known that I, SAMUEL REMBERT, of Memphis, in the county of Shelby and State of Tennessee, have invented a new and useful Improvement in Exhaust-Fans, of which the following is a specification.

My invention is an improvement in exhaust-fans, and particularly in that class of such fans adapted for the purpose of conveying, with the aid of suitable piping or connections, seed-cotton, cotton-seed, and other materials; and the present invention seeks to provide a simple construction of fan by which to effectively avoid any injury to the conveyed material by contact with the blades of the fan.

The invention consists in certain novel constructions, combinations, and arrangements of parts, as will be hereinafter described, and pointed out in the claims.

Figure 1:
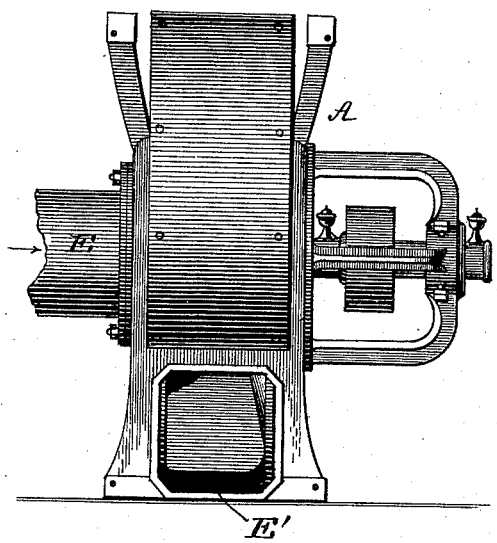
Figure 2:
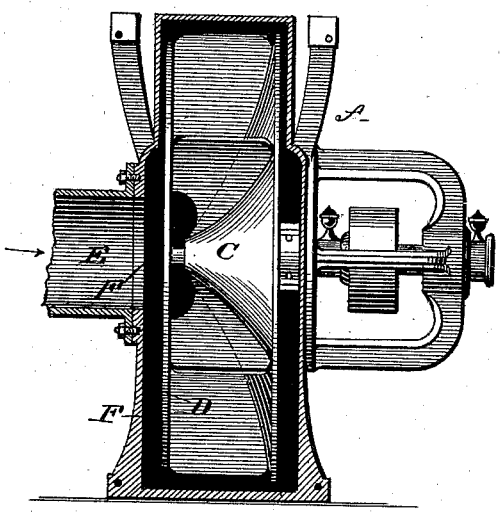
Figure 3:
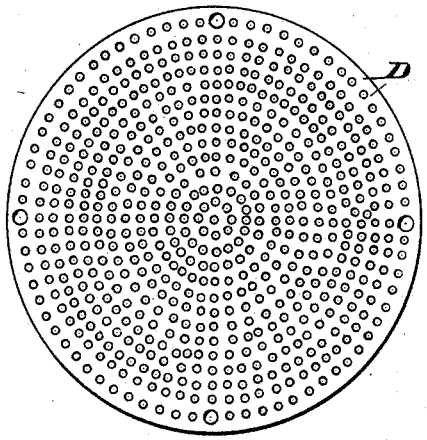
Figure 4:

In the drawings, Figure 1 is an elevation of a suction-fan. Fig. 2 is a sectional view thereof, and Figs. 3 and 4 are detail views of the guard-plate.

In handling seed-cotton and the like the cotton is drawn from a source of supply through piping connecting with the inlet E of the fan A and into and between the rapidly-revolving blades of the fan C, being forced thence through outlet E' and through suitable connections to the point of delivery. In such operation the seed-cotton passes through the blades of the fan and is violently beaten and threshed thereby. This is undesirable for several reasons. The friction resulting from the mechanical contact of the blades and seed-cotton frequently causes fire, resulting not only in injury to the material being handled, but endangering the entire plant. The seed in the cotton is also broken.

To avoid the passage of the seed-cotton or other substance to be elevated through the blades of the fan, I provide a fan-guard D. This fan-guard is preferably foraminous to permit the free passage of air and is secured to and revolves with the fan. In the construction shown and as preferred the guard is a flat metal disk perforated with numerous small holes, but manifestly the guard might be reticulated in structure or made convex or concave in form without departing from my invention, but the flat disk is preferred, as it in no wise retards the free flow of material through the fan. The importance of securing the guard to turn with the fan should be understood. By this construction the friction that would result from the contact of the inflowing material with a fixed guard is avoided and the turning of the guard-plate facilitates the flow of material through the fan-case.

In operation the material flows in the inlet E, thence down through the space F between the fan and the casing and discharges through the outlet E', coming at no time in contact with the blades of the fan.

It will be noticed that the guard is secured to the face of the fan and is arranged directly opposite the inlet E, and the passage-space F extends downward from said inlet, as shown.

Having thus described my invention, what I claim as new, and desire to secure by Letters Patent, is—

1. The combination of the fan-case, having a lateral inlet, of the fan therein and having blades and the perforated or foraminous guard held to and revolving with the fan said guard being arranged between the blades of the fan and the side of the case having the inlet-opening, and spaced apart from such side of the case whereby to form a passage for the cotton and the like substantially as and for the purposes set forth.

2. The improved fan herein described comprising the case having the inlet in one of its sides, the fan supported in said case and having its blades set back from the inlet side of the case, and the guard consisting of a plate having numerous closely-arranged perforations secured rigidly to the edges of the blades and set back from the inlet side of the case forming a passage along said guard and between the same and the case all substantially as and for the purposes set forth.

3. A fan substantially as described having blades and provided with a guard held to and against the edges of said blades and extending outward to the outer extremities of said blades, and the casing having its inlet-opening on one side of and toward the said guard substantially as set forth.

4. The combination with the fan-case having an inlet at one side the fan in said case, the guard turning with the fan, arranged alongside the blades and extending throughout the space between said blades and the side inlet-opening such guard being spaced apart from said opening and the side of the casing in which said opening is formed whereby is provided a passage-way for cotton and the like alongside the guard substantially as and for the purposes set forth.

SAMUEL REMBERT.

Witnesses:
M. L. DASON,
L. STEMLENGER.